US006727990B1

(12) United States Patent
Niemi

(10) Patent No.: US 6,727,990 B1
(45) Date of Patent: Apr. 27, 2004

(54) METHOD AND APPARATUS FOR MONITORING AND ANALYZING THE SURFACE OF FLOATED MATERIAL

(76) Inventor: Antti Niemi, Yrjö Liipolan tie 5, FIN-02700 Kauniainen (FI)

( * ) Notice: Subject to any disclaimer, the term of this patent is extended or adjusted under 35 U.S.C. 154(b) by 0 days.

(21) Appl. No.: 09/980,515

(22) PCT Filed: May 5, 2000

(86) PCT No.: PCT/FI00/00400

§ 371 (c)(1), (2), (4) Date: Apr. 10, 2002

(87) PCT Pub. No.: WO00/68672

PCT Pub. Date: Nov. 16, 2000

(30) Foreign Application Priority Data

May 5, 1999 (FI) ........................................ 991023

(51) Int. Cl.$^7$ .......................... G01N 21/00; B03D 1/14

(52) U.S. Cl. .......................... 356/442; 209/168; 348/91

(58) Field of Search ........................ 356/441, 442; 209/164–170; 348/91

(56) References Cited

U.S. PATENT DOCUMENTS 4,831,641 A 5/1989 Niemi
5,024,334 A 6/1991 Misra et al.
5,038,258 A 8/1991 Koch et al.
5,379,103 A 1/1995 Zigler
5,396,260 A 3/1995 Adel et al.
5,555,984 A 9/1996 Sommer, Jr. et al.

FOREIGN PATENT DOCUMENTS

GB 2 084 723 A 4/1982
WO WO 81/02466 9/1981
WO WO 97/43027 11/1997
WO WO 97/45203 12/1997

OTHER PUBLICATIONS

"The Development of a Color Sensor System to Measure Mineral Compositions"; Oestreich, et al.; Minerals Engineering, vol. 8, Nos. 1/2 pp. 31–39, 1995; Copyright 1994, Elsevier Science Ltd.

"A sensor for assessing the quality of the mineral flotation process", Guarini et al.; Industrial Electronis, 1994. Symposium Proceedings, ISIE '94, 1994 IEEE International Symposium; pp. 386–391.

"Expert system for supervision of mineral flotation cells using artificial vision", Cipriano et al.; Industrial Electronics, 1997. ISIE'97, Proceedings of the IEEE International Sympsoium, pp. 149–153 vol. 1.

(List continued on next page.)

*Primary Examiner*—Richard A. Rosenberger
(74) *Attorney, Agent, or Firm*—Thorpe North & Western

(57) ABSTRACT

At the separation of different minerals from the ores by means of flotation, it belongs to known art to monitor a larger part of the uppermost froth layer in the flotation cell by means of a video camera whose signals are analyzed in a digital computer, in order to detect the structure and color of the froth. The new method and apparatus direct and limit the monitoring and analysis to the surface of the floated material within a fixed, narrow strip which is parallel to the overflow edge of the cell and within which the material surface passing it is homogeneous in the stationary state. The said strip thus presents a renewing sample of the surface at the location in question, which sample represents the stationary state in the average sense. The strip is subjected to homogeneous illumination, which may meet the strip at different angles depending on the primary object, i.e. whether the color or structure is being determined. By means of a repeatedly reading semiconductor line array camera, the image of the strip is formed and converted to electric black/white or multicolor signals from which the structure or color quantities are determined in digital computer. The monitoring and analysis can be directed to both the surface of the froth layer and the surface of the froth slurry flowing down from the overflow edge.

12 Claims, 2 Drawing Sheets

OTHER PUBLICATIONS

Figure 1:
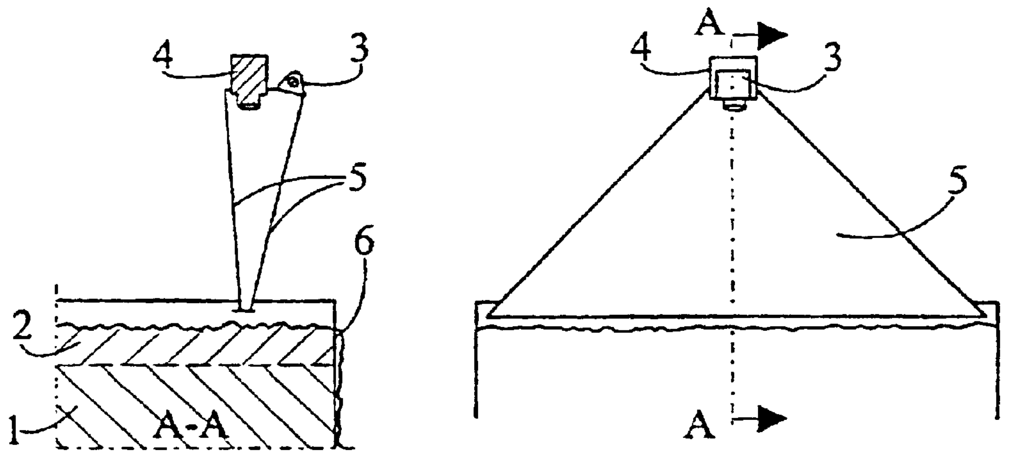

"The classification of froth structures in a copper flotation plant by means of a neural net", Moolman et al. International Journal of Mineral Processing, 43 (1995) 193–208.

"Mass Transport in Flotation Froths", Moys; Mineral Processing and Extractive Metallurgy Review, 1989, vol. 5, Mass Transport in Flotation Froths; pp. 203–228.

"Effect of Froth Structure and Mobility on Plant Performance", Cutting; Mineral Processing and Extractive Metallurgy Review, vol. 5; pp. 169–201.

"On characterization of pulp froth in cells of flotation plant", Niemi et al.; International Journal of Mineral Processing, 51 (1997) 51–65.

METHOD AND APPARATUS FOR MONITORING AND ANALYZING THE SURFACE OF FLOATED MATERIAL

GENERAL BACKGROUND OF THE INVENTION

The desired valuable minerals are separated from the ores in the mining industry by flotation. This is effected in flotation cells of continuous flow type, in which air is conducted into vigorously mixed slurry of ground ore and water. Due to chemical preprocessing, the grains of the valuable mineral tend to adhere selectively on surfaces of air bubbles, to be lifted with these from the slurry to the froth layer above its surface. At the same time, also other mineral grains and mixed (locked) grains of a weaker tendency to float rise to this layer, and return from froth to slurry takes place as well. The froth flows continuously over the cell edge down into a launder producing the concentrate of the cell.

The final concentrate of an industrial flotation circuit consists of concentrates of individual flotation cells, which usually have been cleaned by refloating them, often in several states. The content of the valuable mineral in the concentrate of the cell is, together with the recovery of the valuable mineral, the most important factor on which the economic value of its concentrate depends. Therefore the quality of the final concentrate and, at long intervals, also that of concentrates of the individual cells is controlled by taking samples and analyzing them in laboratory. The most important one of the instruments for immediate measurement of slurries in a flotation plant is the X-ray fluorescence analyzer which mostly analyzes metal contents of solids contained in sample streams separated from slurries. For its high price, this device however does not apply to analysis of the concentrate of a single cell, but instead of that analyzes joint samples of cell combinations or complete flotation circuits. The need for development of an instrument for on-line analysis of operation of single flotation cells or for that of material processed by them is therefore high. For this reason, an attention has recently been paid also to such measurements which relate to the flotation froth.

The appearance of the froth describes sensitively the operational state of the froth layer and even that of the whole cell, because all the material passing it and contained by it arrives to it through the slurry space of the cell. The surface of the froth is visible and the process controller traditionally inspects it by naked eye, in order to observe qualitatively its general outlook and specific features and to then base his manual control actions on his observations and conclusions. Thus he may describe the froth e.g. one of big bubbles, porridge-type, watery, dry, stiff etc., in addition to characterization of its color.

The quantitative, instrumental evaluation of the froth has become possible, as the combination of the video camera and the computer, connected to it for the analysis of the electric image signal, has become available. Since then, several research groups have directed their work to processing of pictures taken of the flotation froth, either in order to determine structures of froths from black/white pictures (e.g. Moolman D. W. & al. in Int. J. Miner. Process. 43(1995), 193–208) or colors of froths from multi-, i.e. usually three-color pictures (e.g. Oestreich J. M. & al. in Minerals Engineering 8(1995), 31–39). Apparatuses with their software used for these aims have since then been subjected to commercialization. It is typical to said studies and apparatuses to observe a rectangular, rather large part of the industrial cell's froth surface, whose horizontal area is typically considerably larger than one square meter, and to process the sampled surface of said type as a representative sample of the cell's froth surface.

The conventional semiconductor matrix video camera device has been used in the stated studies. The U.S. Pat. No 4,831,641 states, for its part, the analysis of flowing suspension in the mineral refining industry and, more particularly, the identification of solid particles in a flowing process fluid, without distinguishing the semiconductor matrix and semiconductor line array cameras from each other. It does not mention the flotation froth, and with suspensions in the stated industry one usually means two-phase solid/liquid suspensions and not the three-phase flotation froth. The illumination of the object is not presented at all in the stated patent.

An individual bubble can, if the camera and light source are located above the cell, be distinguished by means of light, which is reflected strongly back by its top area. This small, bright spot is in such a case surrounded by a darker zone. Depending on the illumination, the darkest regions may lie at the border of two bubbles, but the bottom of the valley separating the bubbles appears often also bright, because of the light it reflects, or is manifested by a stepwise change of the degree of darkness. Determination of the structural parameters of the froth, such as the mean bubble size and the form, density and size distribution of the bubbles can, further on, be based on the borderlines. The speed of the froth's movement is, for its part, determined by comparing successive pictures with each other. It is also customary to determine the brightness distribution of the imaged area and to present it in the form of a histogram. Features of the structure can also be determined by means of other statistical methods, on the basis of the frequency of appearance of image elements of different degrees of darkness.—The deterministically and statistically determinable features stated above are examples of quantities which have been determined by image analysis and presented in the literature, and which are generally characterized by a considerably large scatter.

By means of a color video or color television camera one obtains, of the imaged field of the same type, a red, green and blue (RGB) signal, which signal set or the composite signal of standard form corresponding to it can be processed as such or transformed to other code form before processing. Determination of the color or spectrum of the froth suffers from large differences of intensity of the light reflected specularly or diffusely by the froth. Therefore e.g. too high signal elements have to be removed before processing. The color observed depends on mineral composition of the froth, but the determination of this dependence meets difficulties in practice which, in addition to the said differences of intensity, is due to the rather small differences of color of the colored metal minerals and to other, generally black/gray/white minerals present and to variation of their concentrations. Determination of both the structure and color is affected by the inhomogeneity of the quantities observable in the fields of view of the said camera instruments. This has not been taken into account in the studies reported earlier and has at least not influenced their methodologies or hardware technologies; it shall be reverted to lower down.

For the stated determinations described in the literature, one has used previously known computational algorithms or mathematical methods, which have been programmed to the form required by numerical computation in accordance with the aim of use described, or are obtainable from software libraries (See e.g. Niemi A. J. & al. in Int. J. Miner. Process. 51(1997), 51–65 and several of its reference publications). Results of the determinations can be exploited in flotation control, but because their dependence on the input quantities of flotation is generally not accurately nor unambiguously known, the statements on control and regulation have remained on the stage of draft in the literature.

PARTICULAR BACKGROUND OF THE INVENTION

In an ideally operating flotation cell, the entering air is distributed symmetrically around its axis in the horizontal plane, an the bubbles are distributed homogeneously, still as they reach the lower interface of the froth layer. The froth leaves the cell, which typically has the form of a rectangular parallelepiped, over one of its edges, or sometimes over its two opposite, parallel edges. Thus the liquid and solids which are carried along by the bubbles which rise to the froth layer in the rear part (correspondingly sometimes in the middle part) of the cell spend the longest time for their travel to the overflow edge and out of the cell. The amount of the stated components and of these, especially that of the others than the floatable primary mineral certainly decreases during the travel, as the bubbles break and join to each other, and as their grains either adhere to the bubbles aside or below them, displacing grains adhered more weakly to these, or flow between the bubbles down to the slurry space. That part of the material lifted in the rear part which stays in the surface layer of the froth moves, at first slowly and then, at an increasing speed, toward the overflow edge. The acceleration is caused by the new material rising everywhere to the froth layer which, despite of the selective return of the solids, gives a continuous impulse directed toward the free edge of the froth. Thus the surface is continuously reached by material lifted to the froth nearer to the overflow edge whose residence in the froth remains shorter and liberation from gangue en components less.—Theoretical models of the froth layer have been derived (e.g. Moys, M. H. in Frothing in Flotation (Editor J. S. Laskowski), Gordon and Breach, UK 1989, 203–228), but they have not enabled one to make practical conclusions on the mineral concentrations of the froth surface.

As a result of the process described, the mineral composition of the froth surface changes at the transfer toward the overflow edge. This change and the continuous growth of the transfer rate in the same direction imply an inclination toward inhomogeneity, also in the structure of the froth. The inhomogeneity of the industrial flotation froth has accordingly been stated in the literature of the branch (Laplante A. R. & al. in Min. Proc. Extr. Met. Rev. 5(1989), 147–168). More lately, Niemi A. J. & al. (Int. J. Miner. Process. 51(1997), 51–65) have, in their study of apatite flotation cells, observed that the relatively light color of the froth in the rear part of the cell corresponds to a higher apatite content than that of the froth in the neighborhood of the overflow edge, the color of the latter being clearly affected by the red-brown mica present as a gangue. A video camera imaging a rather large area of the form of a rectangle has been used in the latter, experimental study in which the analysis of partial areas of the images transmitted by the camera has produced the stated result.

One may further conclude that the analysis of the information contained by a relatively large surface area as an entity, neglecting the differences of color and structure between its different parts, delivers only average results. With regard to the concentrate produced by the cell, they have to be considered as rough approximations, especially paying attention to the fact that the part of the image area which is closest to the overflow edge is, with regard to the concentrate being formed, much more significant than the other parts or averages of the imaged area. The observation is also influenced by the inhomogeneity of illumination of the object which is the greater the larger the area of the froth surface being measured and which correspondingly distorts the image being formed on the detector.

New Method and Apparatus

On the basis of the stated studies and the character of the process, it is obvious that, in the surface layer of the flotation froth, the age distributions and transfer rates of the liquid phase and of the different phases of solids and, further on, the mineral compositions of the solids change, as one moves, within the surface of the froth, from the rear part (middle part) toward the overflow edge. It is also obvious that these changes have an influence on the structure and the visually observable properties of the surface layer. The age of a material element means here the time, which has been spent since its transfer to the froth layer from the slurry space.

On the other hand, there are no physical reasons to assume that changes would be present in the direction which is perpendicular to the direction of the stated movement, i.e. in that of travel from one side of the cell to the other parallelly to the overflow edge, excluding the effect which the side walls of the cell may have in their immediate neighborhood on the movement and structure of the froth. The central feature of the new method is accordingly the acquisition of representative image information of the froth layer in such a manner that the observation and the analysis of the result of observation are directed to a narrow strip of the surface, which strip is parallel to the overflow edge. The length of a strip of this kind, within which the quality of the froth is essentially even, may be equal to the breadth of the cell or less than this, e.g. in the presence of said side wall effect or for other reason, such as one related to the technology of the measuring device.

Even when the flotation process operates in a stationary state, the outcome of a momentary measurement and the property determined on the basis thereof differ from the stationary value because of the process noise. E.g. the diameter of even one, big bubble may be several percents of the length of the measured strip, and therefore the structure, brightness, color and other properties of the froth have to be determined as averaged and distributed quantities over the strip, usually by means of several, successive observations and gliding determinations. The quantities obtained in such a manner describe the properties of the froth at each chosen location better than the quantities determined over a larger surface, which has been assumed homogeneous but is inhomogeneous in reality.

Location of the strip to be observed depends on the primary aim of the observation and analysis. With regard to the froth structure, it is best placed before the overflow edge, at a location where the speed differences caused by the overflow do not yet deform the bubbles. The data obtainable near the overflow edge and after this describes, for its part, better the final concentrate of the cell, especially with regard to the color and therefore also to the mineral concentration. On the other hand, the observation and measurement before the overflow edge can in principle, at no change of the other input quantities than the mineral concentration of the cell feed, be calibrated to indicate the mineral concentration as well.

Homogeneous illumination of the froth strip being observed can require construction of reflective surfaces and that of screens for elimination of external light, in accordance with the aim of use and the local conditions of use, but the In device system for stated determinations may, in other respects, consist, for its main part, of a combination of commercially available devices. Some of such devices are AC and DC lamps of an appropriate power and emission spectrum, optical filters, semiconductor line array cameras (in special cases matrix cameras) with conventional lens optics which take black/white and color pictures at adjustable or fixed intervals, digital, primarily micro computers, devices for transfer of information between said devices and output devices for results of measurements and analyses.

The device system for carrying out the observation and analysis according to the method described may consist of e.g. the apparatus according to U.S. Pat. No 4,831,641 comprising a linear photodiode array detector. In such a system, a decreased image of the aimed froth strip and of its immediate environment is formed by means of conventional, spherical optics in such a manner that the strip is imaged within the detector's area, i.e. an optics of a suitable focal length and its distance from the froth are chosen so, that the imaging takes place in the manner described. The dimensions of the detector determine, at the same time, the breadth of the froth strip being observed, and the number of its elements the resolution of the observation in the direction of the strip. The scanning rate of the detector is then chosen suitably so, that each element of the surface will be read approximately once, as the froth moves at its average speed. In addition to the detectors which consist of one semiconductor line array, also such integrated detectors arc available which comprise several, parallelly located line array detectors. In them, the signals of parallel elements are added to each other and they deliver only one, serial output signal; the line array detector stated earlier is, above and in the following, considered to comprise also such detectors.—Line scan cameras are obtainable for such uses as industrial products which sufficiently meet the requirements set to the optics, resolution of the observation and reading frequency of the detector. In addition to the one-color cameras, RGB and other color cameras are obtainable, in which the colors of the optical image signal either are separated by filters or the image signal is divided by e.g. a prism to its components, which are then guided to different semiconductor line array detectors. The optical signal range is in the following considered to cover the range of the electromagnetic, both visible and invisible radiation, such as that of the infrared and ultraviolet light to the extent to which the lens optics and semiconductor detectors are able to operate.

The electric, discrete signal corresponding to the optical image signal is read from the detector elements in the form of series of pulses, and each signal element is converted to a digital number, which is proportional to the amplitude of the signal element and therefore to the level of grayness of the image element. The reading and processing of the data and transfer of data for processing into the central unit or for storage into the memory of the computer thus proceed practically e.g. in the manner described in the stated patent. Alternatively, the information measured can also be transferred in the form of a continuous analog signal which is discretized and converted to digital data in the interface unit of the computer.

Transfer of data into the central unit of the computer and storage into its memory are programmed for implementation of such previously known methods which have been used for analysis and interpretation of information transmitted by the line array camera in the monitoring of fixed, mechanically movable pieces, like in the classification of rocks moved on a conveyor belt in the mining industry or in search and observation of surface defects of metal plates in connection with the rolling. The processing of data is programmed for implementation of the numerical methods, which are known from the analysis of a large froth surface on the basis of the image transmitted by a matrix camera, after they have been reduced to processing of one-dimensional data, or using them in their two-dimensional form, in the manner to be described in the following. Thus the grayness histogram of the froth strip is obtained by arranging the measured data according to their degree of grayness and the function describing the texture of the strip from variation of the grayness by means of e.g. the Fourier transformation, both of them as average functions of a number of measurements and analyses. Corresponding to this, the breadths of the bubbles and the distribution of the breadth are obtained as quantities, which are determined deterministically.

A two-dimensional representation of the froth at the location of the strip is constructed, for determination of forms of the bubbles and for that of e.g. two-dimensional, statistical quantities, by joining the successive strip signals to each other. A picture of this kind represents the froth in the stationary state better than any momentary observation transmitted by the naked eye or matrix camera, or an average picture derived from such observations. The constructed, two dimensional picture can then be processed by means of previously known methods, which have been used for the processing of froth pictures taken with the matrix camera. It can, further on, be displayed on monitor as a picture representing the strip under observation, for visual inspection and detection of properties of the froth and for that of their changes.—However, if the speed of the froth is subject to variations, it has in such a case to be determined separately and taken into account at the joining of the strip signal to the previous one. Here one may take a benefit of e.g. the fact that such bubbles which are small but have a breadth corresponding to at least several image elements are, in most mineral froths, circular as seen from above. Under such conditions one may determine, at times and using as may be needed a faster scanning frequency of the semiconductor line array detector, the time interval during which the front or rear end of each chosen bubble passes the field of view or its edges. The momentary speed of the froth in the principal direction of flow is calculated on the basis of the stated time interval and the measured breadth of the bubble, which is equal to its diameter.

FIG. 1 presents a typical device system for observation of, primarily, the structure of the froth surface. The surface of the froth layer 2 above the slurry 1 is illuminated by the illuminator 3 and observed by the line array camera 4. The screen 5 checks the access of outside light to the froth strip being observed and to the camera.

Figure 2:
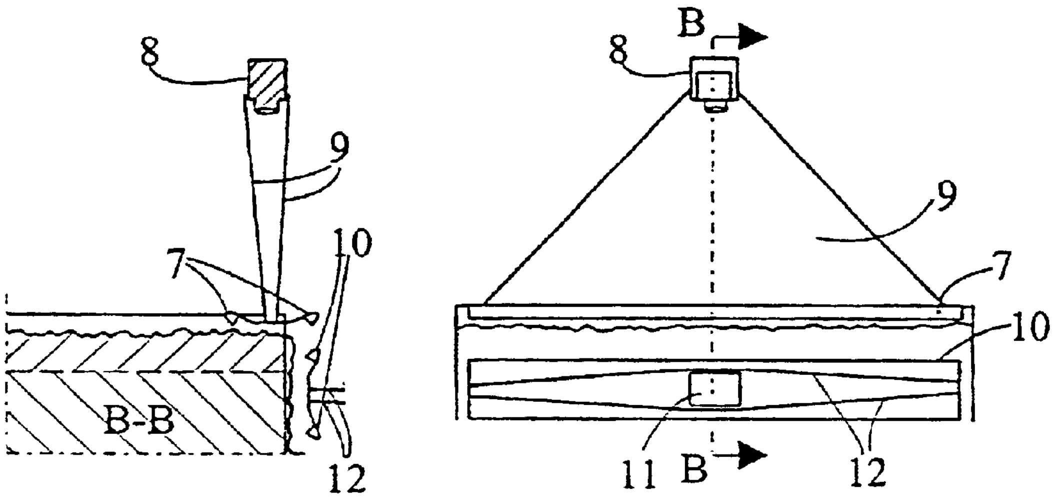

FIG. 2 presents a typical device system for observation of, primarily, the color of the froth. The surface of the froth layer near the overflow weir is illuminated by illuminators 7 of long form and observed by the line array color camera 8. The screen 9 and illuminators with the structures supporting them check the access of outside light to the froth strip being observed and to the camera. —The froth slurry flowing down is illuminated and observed, and the access of outside light checked by equal, essentially horizontally imaging devices 10, 11, 12. Sectional drawing B—B is so limited that the camera 11 does not appear in it.

Figure 3:
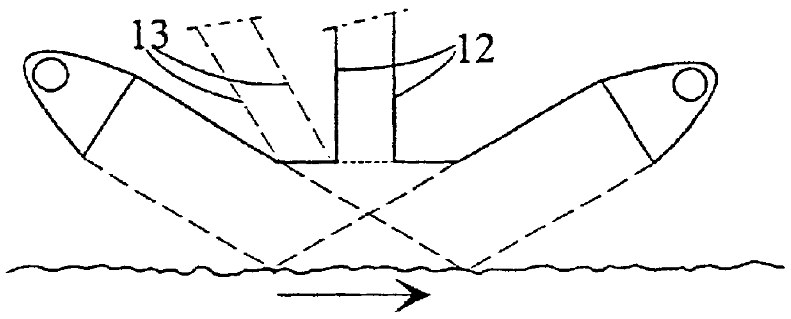

FIG. 3 is magnified drawing of a detail of illumination of the froth by illuminators according to FIG. 2.

Figure 4:
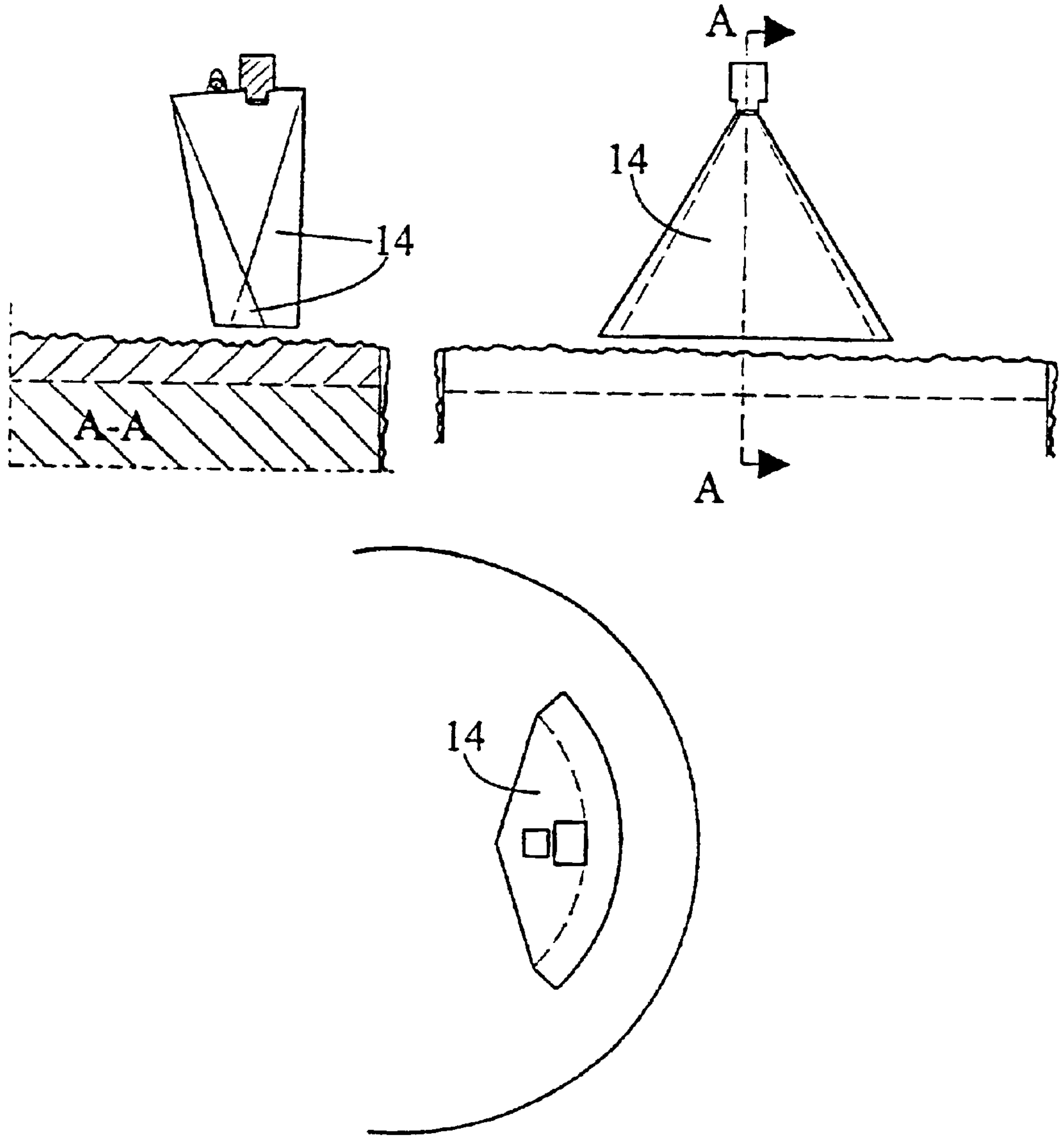

FIG. 4 presents a device system for observation of the structure of the froth surface in a cylindrical flotation cell. The screen 14 checks the access of outside light to the curved froth strip being observed and to the camera.

In the embodiment according to FIG. 1, the line array camera observes a narrow froth strip, which is parallel to the overflow edge 6. At determination of the froth structure in the first place, it is illuminated from a direction which is close to that of the camera, preferably by a small-size illuminator 3. In such a case, the distinction of different bubbles can be based on reflections from their top areas. The illuminator with its reflector, possible light absorbing surfaces and choice of lamp is designed for delivery of light aimed to the froth strip being observed and being as plane as possible, and for such a distribution of light in the related plane, that it produces a homogeneous illumination of the strip along its total length. The narrow field of view and the optics of the camera 4 are guarded against outside light by a lamellar screen, the inner walls of which are painted for minimal reflectivity; less of screening is needed, if the amount of disturbing, outside light is small. FIG. 1 presents a device system described above. Because its narrowness, the apparatus covers only a small part of the froth surface and therefore does not essentially decrease the possibilities of the process operator to monitor the froth visually.

The arrangement according to FIG. 1 for illumination and imaging can be used to determination of also the color of the froth. However, for this task it is better to apply an illumination of the froth surface in a low angle or within a low range of the angle, in order to avoid large differences in the light received and reflected by the bubble surfaces of different directions and therefore e.g. the bright reflections by the tops of the bubbles. FIG. 2 presents a device system according to this, in which the illuminators 7 have been placed at the root of the observation channel, being outside this as explained by FIG. 3. They deliver homogeneously distributed light to a chosen froth strip located preferably close to the froth overflow, mainly in a direction which belongs to the symmetry plane of the reflector and is perpendicular to the illuminator of long form. The screen 9 is similar to that of FIG. 1 and the line array color camera 8 has been placed similarly to the camera of FIG. 1; thus they produce the same advantages as those stated previously. Instead of the vertical direction, the apparatus may be oriented also obliquely, e.g. so that it is perpendicular to the surface of the material, as this passes the overflow edge, or horizontally, in order to illuminate and observe a narrow strip of the froth slurry flowing down from the overflow edge of the cell (alternative components 10, 11, 12 are hereby the same as the components 7, 8, 9 stated previously). The location of the devices for illumination and observation is essentially influenced by breakage of the bubbles at the overflow edge and after this, as the flow accelerates and hydrodynamic stresses grow rapidly. At the breakage of bubbles coming from different levels of the froth, the slurry is also mixed. Therefore the representativeness of the sample being observed as an indicator of the color and thus the concentration of the concentrate is improved, especially after the overflow edge has been passed. Whenever the color is the primary object being monitored, the description of the structure remains secondary. Therefore, and if e.g. at the same time the need of space required by the devices outside the cell is wanted to be decreased, the camera and screen can be directed obliquely to the object, especially to the surface of the froth slurry flowing down, while the orientation of the illumination with regard to the surface is not changed. This orientation of the camera and screen as an alternative to the orientation of the previously stated screen 12 and camera 11 appears from the orientation of the root of the alternative screen 13 in FIG. 3.—As far as is known, no method or apparatus for formation and real-time analysis of the optical image of the flotation product flowing down from the overflow edge has been presented earlier.

In an application related primarily to the structure of the froth, the system described is located upstream of the overflow edge area and observes an undeformed froth surface, for determination of its structure in the chosen strip. The information delivered by it represents unambiguously the stated structure, because under a steady operation of the cell the average values of all quantities are invariable, although the momentary values vary randomly. Contrary to this, the information delivered by the previously known systems using the matrix camera (typically e.g. 512 sensor elements ×512 sens. elem.) for imaging of the froth is not equally representative, since they do not take the inhomogeneity of the large, two-dimensional froth surface imaged into account. In addition to this, a narrow strip is, especially at determination of the froth color, more easily illuminated homogeneously than a large surface. Further on, the line array camera is cheaper than the matrix camera and the software needed for processing of the data produced by it is simpler than that in the case of the matrix camera. The new method does not either essentially limit a visual inspection of the froth surface.

In another application related to the color of the froth, the system described measures a color quantity which, after it has been converted to a concentration quantity, is related to the mineral concentration of the solids. Line array color detectors and cameras incorporating them are used, whereby it is typical to their use that the color signals being obtained are in each case based on the chosen, narrow froth strip. The colors are determined on the basis of the amplitudes of the components of the color signals. With regard to the homogeneity of illumination, visual observability of the froth or slurry surface, economy of the apparatus and ease of the programming, the new color observation system is more advantageous than the corresponding system using the matrix camera, the use of which system for observation of the froth slurry at the front wall of the cell is not previously known, as stated above.—A chosen, single color signal component can additionally be used, similarly as a black/gray/white signal, for determination of the froth structure.

Also an apparatus comprising a matrix camera can be programmed to read repeatedly the same, single row of elements which is parallel to the overflow weir, whereby measured information is obtained of a narrow froth strip, in principle in the same manner as by using the line array camera system. Such a use of the matrix camera for observation and analysis of the flotation froth has, however, not been reported and, as far as is known, not applied up to the present If used in this manner, homogeneous illumination would result, and good protection against outside sources of light and simultaneously good visual observability would, however, be reached only by using illumination and screening which are similar to those according to the new invention and which have been described in connection with the present Specification and FIG. 1. Although the use of the matrix camera in such an implementation belongs to, the scope of the invention, it would be technically inconsistent to use, in absence of any benefit, the technically more complicated matrix detector for observation of a narrow, linear strip, instead of the line array camera system which is simpler and easier to use and which also belongs to the scope of the invention.

The values of the quantities corresponding to the physical properties of the froth and determined with the new method described, and the values of the quantities derived from them by computation are displayed numerically and graphically by monitors and printed by line, laser and other printers for information to the process supervisor and for application to process control by him. They can be brought also in digital and analog form to regulators and actuators controlling inputs of the flotation process, for automatic control and regulation of the process. The actuator and the input quantity of the process, which are controlled by the quantities produced in the stated manner are determined by the properties of the process being controlled. They are chosen so that the correcting effect corresponding to the measured data or their change is accomplished and especially in the case of feedback control the measured deviation from the setpoint is eliminated. The flotation circuit or cell is, for requirements of process technology, provided with at least manual actuators of this kind and corresponding devices for automatic control are available. The stated setpoint is, for its part, that value of the measured quantity which this quantity is wanted to have at the point of measurement, under nominal conditions of operation. It may be constant, but it may also be adjusted manually or automatically, depending on the operational conditions, such as the content of the valuable mineral in the ore being processed. A new feature in automatic control of the flotation cell is implied by the new measured quantity of the control which is based on observation of the locally fixed froth strip. It describes the process more unambiguously than the earlier methods and device systems and, being brought to the devices which control the inputs of the process, produces therefore a better control result than they do.

In the preceding description of the invention, the object of its preferred application has been the conventional flotation cell in which the overflow edge is or edges are straight. Flotation cells which differ from it are also present in the industry, and similarly e.g. cells provided with scrapers of froth, but making the logically required changes one may apply the new method also to them. Application to a cylindrical flotation cell whose overflow edge is a horizontal circle or part of a circle is presented in the following, as an example of such a different type of embodiment of the invention.

In the cylindrical flotation cell presented in FIG. 4, the strip being observed is, analogously with the preceding text, a curved area of the froth surface which is limited by two circular arcs which have a common center point with the cell. The stated area is thus everywhere parallel to, and of the same form as the overflow edge. Its longer radius is normally the same as, or shorter than the radius of the overflow edge. The chosen length of the strip which has been considered representative determines its part of the full circle or the corresponding central angle, and the side wall effect mentioned in connection with the embodiment described earlier is now absent.

Especially at determination of the froth structure, the illumination and imaging of the strip can be directed to take place between such conic surfaces which pass the strip along its edges, whereby the length of the strip determines the needed breadth of the part of conic surface. This part tapers linearly up to the top of the corresponding cone, which in the case of a straight cone is located above the cell, on the central axis. However, it is often more advantageous to locate the tops outside the central axis, above the axis of the sector limited by the strip, whereby the corresponding surfaces are parts of oblique, conic surfaces. The camera may be located e.g. vertically above that point of the sector axis which is the median point of the total strip surface in the axial direction. The outer surface may thereby practically be, instead of the a part of oblique, conic surface referred to above, a part of that vertical, cylindrical surface which is determined by the outer edge of the strip, and only the inner surface a part of an oblique, conic surface.—The stated conic and cylindrical surfaces 14 and the side walls connecting them to each other check the outside light from disturbing the froth observation, by checking its access to the area being imaged and to the camera.

The small-size light source and camera are located between the tops of the cones stated or meant above, or close to this place. The curved froth strip is imaged camera-optically e.g. on a narrow sensor of the form of a semicircular arc consisting of semiconductor elements; such sensors have been produced for special uses. The distance and focal length of the camera are fitted in such a manner, that the image of the desired strip falls for its whole length on said sensor or on such part of the sensor which corresponds to the length of the strip. The discrete, electrical image signal is thereafter read and interpreted in the manner presented in a previous place, for the case of the linear array detector.

If the overflow edge is not straight, it may prove difficult to find a sensor of suitable curvature and number of elements. For this reason and also for simplification of focussing of the image, it may prove beneficial to use the conventional semiconductor matrix sensor and camera in such a case, although its use in the case of the flotation cell with straight edges, for observation of the straight froth strip, was previously shown technically inconsistent as compared with the use of the line array camera. Using now the matrix camera for observation of the froth surface in e.g. a cylindrical cell, the narrow strip of the same direction and form as the overflow edge is corresponded by a sensor element set of the same form on the matrix sensor, which elements form a connected chain. The distinction and separation of the corresponding, electrical set of elements from the digital image signal being obtained are logically managed by a professional who is familiar with image processing.

Correspondingly, the determination of the froth color proceeds in the case of a cylindrical cell using most appropriately the conventional matrix color sensor and camera in the same manner as that presented above about the use of the black/white camera, taking with regard to the use of the electrical color signals into account those special features which were presented earlier on use of the line array color camera for observation of the froth color in a cell with straight edges. Also the homogeneous illumination in a low angle needed here is accomplished analogously to the illumination of the straight froth strip. Since however the accomplishment of an illumination following the curved edge of the conic or cylindrical surface may hereby prove difficult, it can be produced approximately, by dividing it to several straight illuminators along the edge. Correspondingly, the conic and cylindrical surfaces can be divided to the same number of plane surface segments with straight edges, removing the opposite surfaces farther from each other in such a manner that a sufficient homogeneity remains and no part of the object strip falls in shade.

After the image of the curved froth strip has been formed and transferred to a computer in the manner described in the preceding paragraphs, it can be subjected to the analysis procedures which were presented earlier, in connection with the flotation cell of parallelepiped form. E.g. a two-dimensional picture of the froth at the location of the strip is formed in a manner which corresponds to that presented earlier. At the same time, one may straighten each one of the strips to be joined to a linear form without changing the amplitude readings of its elements. The picture born by such means is formed in a rectangular coordinate system which is convenient considering the use of most, numerical analysis methods.

In the case of the froth slurry flowing down along the cylindrical surface of the cell, both the illumination and imaging are accomplished with units according to FIG. 2 which are constructed to be sufficiently narrow and installed next to each other, at the same height and at the same distance from the cylindrical surface each, so that a sufficiently homogeneous illumination and geometrically sufficiently correct image is reached. The signals delivered by the line array color sensors are then combined in the common computer of the units, in order to produce color information which represents a sufficiently wide froth slurry flow. Under good conditions, when the froth slurry flowing down is homogeneous in the horizontal direction over the cylindrical surface, even a single illumination and observation unit may be sufficient for delivery of representative color information.

In the same manner as in the embodiment presented above, the new invention is considered to cover the applications of the presented method to other flotation devices which differ in the details of their structure and to which its application, on the basis of the presentation above, is obvious to a professional skilled in the art. Similarly the structures and instruments for production of the wanted illumination and observation are to be understood as examples which cover also such devices which for different objects of use are natural alternatives to a professional.—The economy of the apparatus according to the invention and its technical simplicity make its use, taking the expected improvement of quality of the concentrate into account, advantageous in many, even in all cells of a larger flotation system and a complete flotation plant. An additional, technical and economic benefit is thereby produced by centralization of the processing of image information so, that the signals transmitted by several cameras are processed by common computer or computers, and the output of the data determined is concentrated as needed to common devices for presentation and to devices controlling the larger flotation system.

What is claimed is:

1. A method for monitoring and analyzing the surface of floated material, in which an optical image of said surface is formed continuously and converted repeatedly, optoelectrically to electrical signals which are read, transferred and processed digitally for determination and output of quantities corresponding to physical and statistical properties of said material and surface, and in which said floated material is the flotation froth upon a flotation cell, characterized in that said image is at the optoelectrical conversion limited to a narrow strip with sides of the same form as the overflow edge of the flotation cell and divided into a chain of image elements, and that the elements of the detected, electrical signals correspond individually to said image elements and that, corresponding optically to said image being limited to a narrow strip, a strip of the same form on said surface is homogeneously illuminated and everywhere at an equal distance from the overflow edge of a flotation cell.

2. A method according to claim 1, characterized in that said image limited to a narrow strip is divided to sets of image elements arranged in chains of an equal form and representing different color components, whereby the number of said chains is at most same as the number of said color components, and that sets of elements of the electrical signals are produced corresponding to said sets of image elements representing different color components.

3. A method according to claim 2 wherein said flotation cell has a straight overflow edge, characterized in that the sets of image elements are arranged in rows and that the number of said rows is at most same as the number of said color components.

4. A method according to claim 1 wherein said flotation cell has a straight overflow edge, characterized in that said image is limited to a narrow rectangle consisting of a row of image elements.

5. A method for monitoring and analyzing the surface of floated material, in which an optical image of said surface is formed continuously and converted repeatedly, optoelectrically to electrical signals which are read, transferred and processed digitally for determination and output of quantities corresponding to physical and statistical properties of said material and surface, characterized in that said floated material is the froth slurry flowing down from the overflow edge of flotation cell, that said image is at the optoelectrical conversion limited to a rectangle and divided to sets of image elements representing different color components, and that sets of elements of the detected, electrical signals are produced corresponding to said sets of image elements representing different color components.

6. A method according to claim 5, characterized in that said image is limited to a narrow rectangle and divided to rows of image elements representing different color components, whereby the number of said rows is at most same as the number of said color components.

7. An apparatus for monitoring and analyzing the surface of floated material, comprising:

at least one light source (3, 7, 10) and optical components for illumination of the surface of floated material, and a screen (5, 9, 12, 14) for checking the access of outside light, a camera (4, 8, 11) for continuous formation of the optical image of said surface and for repeated production of electrical signals corresponding to said image, as its output quantity and a digital computer for receiving and processing said signals, and for determining quantities corresponding to physical and statistical properties of froth, with its interfaces for delivering the values of said quantities to central supervision and process control devices, characterized in that said electrical signals produced by said camera and processed by said computer are based on the optical image of a narrow strip of said surface of floated material, the sides of said strip being parallel to the overflow edge (6) of the flotation cell, and that said at least one light source, optical components and screen produce homogeneous illumination to said strip.

8. An apparatus as defined in claim 7, characterized in that said camera is a semiconductor line array camera comprising an optoelectrical semiconductor line array detector and that said homogeneous illumination is provided from a direction which is close to that of said camera.

9. An apparatus as defined in claim 7, characterized in that said camera is a color video camera provided with optoelectrical semiconductor line array detectors and that said homogeneous illumination meets said strip in a low angle.

10. An apparatus as defined in claim 7, wherein said floated material is the flotation froth upon a flotation cell and said camera is a semiconductor matrix video camera, characterized in that said digital computer is programmed to separate and process digitally the electrical signals which are induced by a narrow image strip with sides of the same form as the overflow edge of the flotation cell, said image strip corresponding optically to a locally fixed, narrow froth strip of the same form on the surface of the flotation froth, and that said homogeneous illumination to said froth strip provided from a direction which is close to that of said camera.

11. An apparatus as defined in claim 7, wherein said floated material is the flotation froth upon a flotation cell and said camera is a semiconductor matrix color video camera, characterized in that said digital computer is programmed to separate and process digitally the electrical signals which are induced by a narrow image strip with sides of the same form as the overflow edge of the flotation cell, said image strip corresponding optically to a locally fixed, narrow froth strip of the same form on the surface of the flotation froth, and that said homogeneous illumination meets said froth strip in a low angle.

12. An apparatus for monitoring and analyzing the surface of floated material, characterized in that the apparatus comprises:

at least one light source and optical components for illumination, in a low angle, of the surface of froth slurry flowing down from the overflow edge of a flotation cell, and a screen for checking the access of outside light to said illuminated surface, a color video camera provided with at least one optoelectrical semiconductor matrix detector for continuous formation of the optical image of said surface and for repeated production of electrical signals corresponding to said image, as its output quality, and a digital computer for receiving and processing said electrical signals, and for determining quantities corresponding to color and other physical and statistical properties of froth slurry, with its interfaces for delivering the values of said quantities to central supervision and process control devices.

* * * * *